United States Patent
Pakki et al.

[11] Patent Number: 6,162,357
[45] Date of Patent: Dec. 19, 2000

[54] MAGNETIC FILTER-SEPARATOR HAVING ROTATABLE HELICAL RODS

[75] Inventors: Victor Pakki, Kharkov, Ukraine; Arkady Beleski, Marblehead, Mass.; Arnold Inna, Kharkov, Ukraine; Gleb Pakki, Kharkov, Ukraine; Michael Pakki, Kharkov, Ukraine

[73] Assignee: Boston Bay International, Inc., Boston, Mass.

[21] Appl. No.: 09/157,426

[22] Filed: Sep. 21, 1998

[51] Int. Cl.[7] ............................ B01D 35/06; B01D 33/27; B03C 1/30
[52] U.S. Cl. ............................ 210/223; 210/222
[58] Field of Search ........................... 210/223, 222, 210/215, 695, 414, 415, 512.1; 96/1, 2

[56] References Cited

U.S. PATENT DOCUMENTS

| | | | |
|---|---|---|---|
| 2,838,179 | 6/1958 | Thomas | 210/223 |
| 3,337,053 | 8/1967 | Sommermeyer | 210/223 |
| 3,481,471 | 12/1969 | Spodig | 210/222 |
| 3,875,061 | 4/1975 | Palma | 210/223 |
| 5,401,396 | 3/1995 | Lescovich et al. | 210/108 |

FOREIGN PATENT DOCUMENTS

| | | |
|---|---|---|
| 891120 | 12/1981 | U.S.S.R. |
| 1318258 | 6/1987 | U.S.S.R. |

OTHER PUBLICATIONS

Derwent Abstracts 85300E (SU 886940), Self–cleaning canister filter, Apr. 1980.
Derwent Abstracts 90062E (SU 891120), Magnetic filter for cleaning liq.coolants forelec.machines, Dec. 1981.
Derwent Abstracts 88034758 (SU 1318258), Filter for cleaning liquids, Apr. 1980.

*Primary Examiner*—W. L. Walker
*Assistant Examiner*—Marianne S. Ocampo
*Attorney, Agent, or Firm*—I. Zborovsky

[57] ABSTRACT

A filter separator has a housing provided with inlet and outlet pipes, a filtering element arranged in the housing, a magnetic screen arranged in the housing, the magnetic screen including a plurality of helical rods and magnetic plates fixedly arranged on the rods, the rods being rotatable around the filtering element.

4 Claims, 3 Drawing Sheets

MAGNETIC FILTER-SEPARATOR HAVING ROTATABLE HELICAL RODS

BACKGROUND OF THE INVENTION

The present invention relates to devices and methods of purification of oil from mechanical impurities in circulation lubrication systems, and can be used in gas, automobile and other industries.

A self-cleaning cartridge filter is disclosed for example in the inventor's certificate of the Soviet Union 886,940 and utilized for cleaning of natural and recirculating waters. This filter has a casing with an inlet pipe and an outlet pipe for liquids, filtering cartridges, brushes, a rotary drive for the brushes, and a pipe for purification withdrawal.

This filter has the disadvantage that the liquid purification can not be performed simultaneously with all filtering cartridges, since periodically one of the filtering cartridges must be turned off for washing.

Another filter for liquid purification is disclosed in the inventor's certificate of the Soviet Union No. 1,318,258. It has a housing, a cover with inlet and outlet openings, a filtering element mounted in the central part of the cover, and a magnetic trap. In order to increase the efficiency of purification and service life of the filter, the magnetic trap is formed as a permanent ring-shaped magnet arranged at the end sides of the pole shoes in form of disks of soft magnetic material. The disadvantage of this filter is that the magnetic cap is not cleaned. Moreover, the filter is characterized by a high metal consumption.

Another filter is disclosed in the inventor's certificate of the Soviet Union No. 891,120. It is used for liquid cooling of large electrical machines and includes a housing, inlet and outlet pipes for liquid, a magnetic guide with openings, and a magnetizing winding. The disadvantage of this construction is that it does not provide for a continuous liquid purification, since in order to clean the filter by a reverse washing, it is necessary to stop filtration. Moreover, mechanical impurities settle on the surface of the magnet, they are partially washed out by a liquid stream, and enter the system with pure liquid.

The closest filter to the present invention is the one which is used in cleaning of working liquids as disclosed for example in the publication "Purification of Working Liquids in Hydraulic Drives of Machine Tools", Moscow, "Machine Tools", 1976, page 247, FIG. 140. This filter separator has a housing with inlet and outlet pipes for oil, a filtering element and an immovable magnetic screen formed by magnetic rods. Dirty working liquid and oil are supplied through the inlet pipe into the housing of the filter separator, in which they are cleaned by the magnetic screen and then by the filtering element. The ferromagnetic particles are attracted by the screen and deposited on it, while non ferromagnetic particles are caught by the filtering element. Since the magnetic screen is immovable, the magnetic rods become covered with the ferromagnetic particles and the surface of the filtering element is clogged with non magnetic particles. This considerably reduces the inner-regeneration period of the filter-separator.

SUMMARY OF THE INVENTION

It is therefore an object of the present invention to provide a filter-separator, in which the growing of ferromagnetic particles on the magnetic rods and clogging of the filtering element with non ferromagnetic particles are reduced or even completely eliminated.

In keeping with these objects and with others which will become apparent hereinafter, one feature of present invention resides, briefly stated, in a filter-separator of the above mentioned general type, in which the magnetic screen is rotatable around the filtering element and is connected kinematically with a rotary drive arranged in an upper part of the housing, and the magnetic screen is formed as helical rods, on which magnetic plates are fixedly mounted. Also brushes are fixedly arranged on the helical rods from the side of the filtering element.

The helical rods are formed so that they are inclined at different angles to the surface of the filtering element. Also, the rods can have different configurations.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
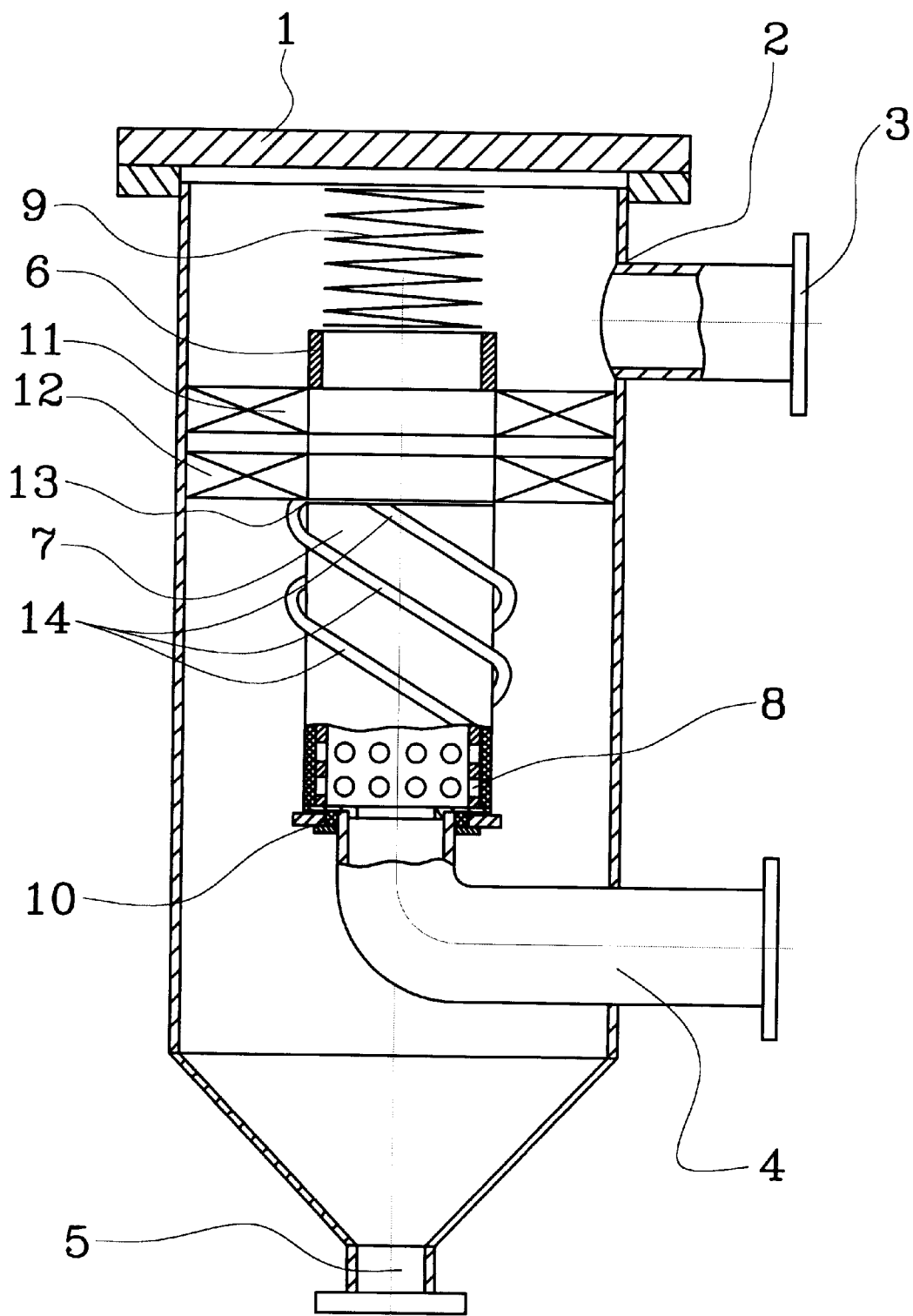
FIG. 1 is a view showing a filter separator in accordance with the present invention.
Figure 2:
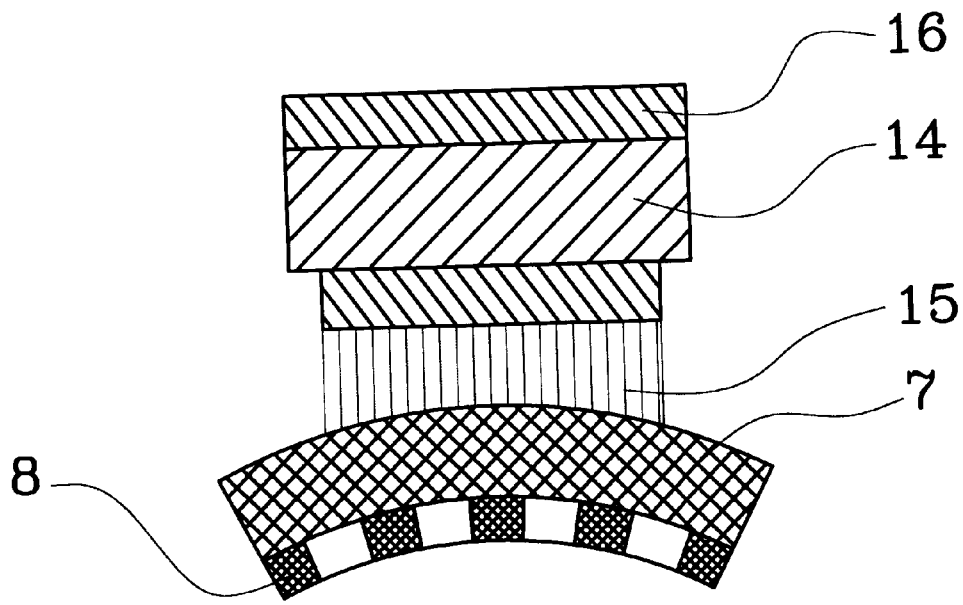
FIGS. 2 and 3 are views showing sections II—II and III—III of the filter separator of FIG. 1.
Figure 3:
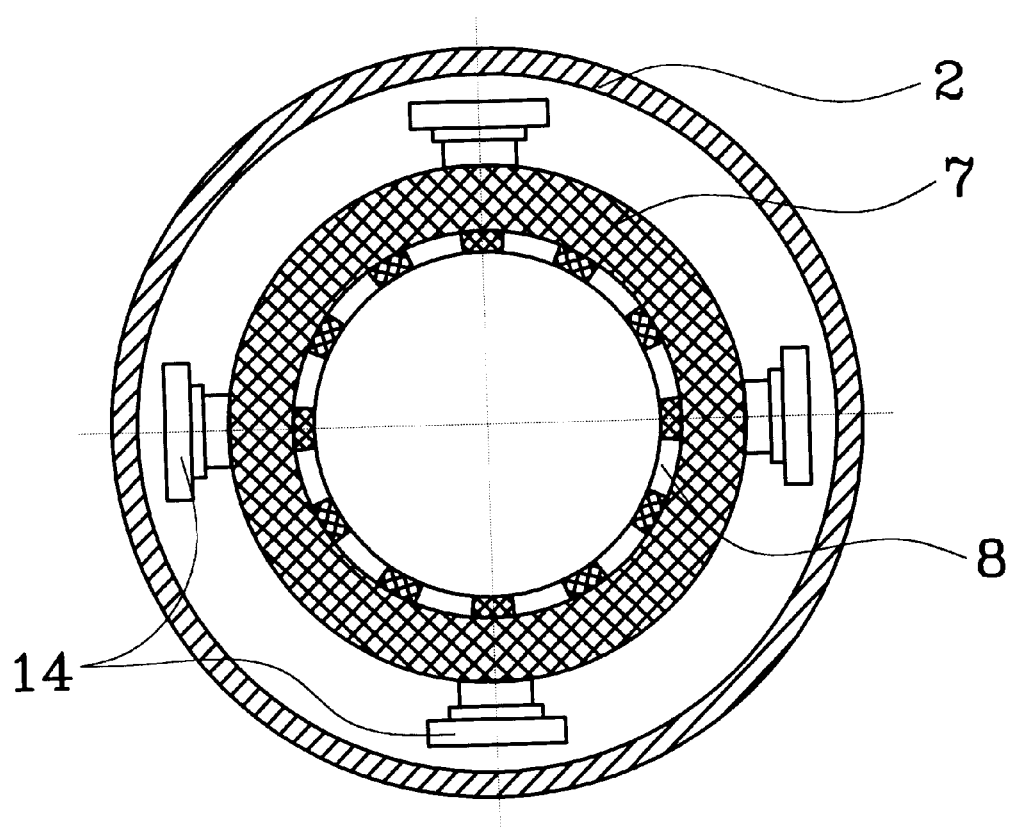
Figure 4:
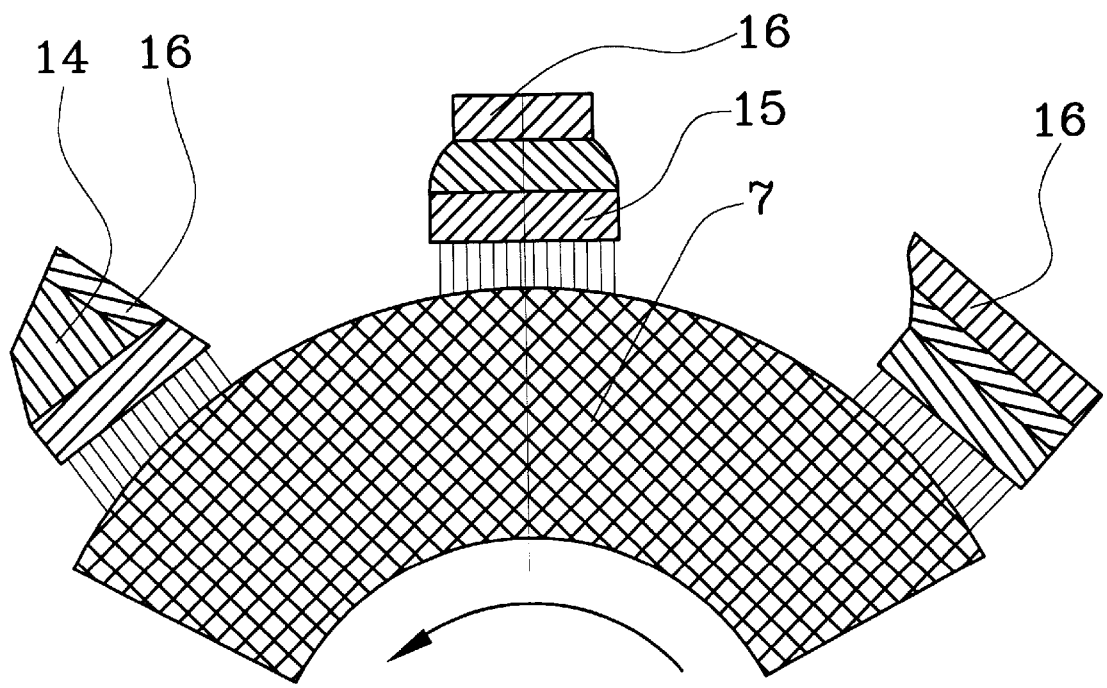
FIGS. 4 and 5 are views showing positions of the screw-like rods relative to the surface of the filtering element.
Figure 5:
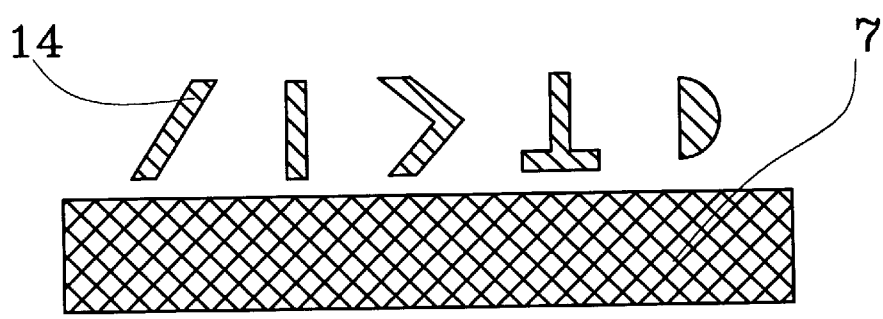

A filter separator in accordance with the present invention has a cover 1 and a housing 2 with pipes 3 and 4 for supply and withdrawal of air. A drainage pipe 5 is located in the lower part of the housing 2. A filtering element 7 is mounted by a bracket 6 inside the housing. It is composed of a polymeric filtering material, for example fluoroplastic and perforated casing 8. The filtering element 7 is spring biased by a spring 9 which is fixedly connected with the bracket 6, toward a seal 10.

A whirling member 11 is arranged at an initial part of the filtering element 7. A turbine 12 connected by a supporting ring 13 with helical rods 14 which form the casing, is located under the whirling element 11. A mechanical brush 15 is arranged at the side of the filtering element 7. Permanent magnets 16 are mounted on the helical rods 14. They form a magnetic screen. The rods 14 have different angles of inclination to the surface of the filtering element 7. They also have different configurations or shapes.

The filter-separator of the present invention operates in the following manner:

Uncleaned oil or liquid containing metallic and non-metallic particles which are magnetic and non-magnetic particles, respectively, is supplied under pressure into the pipe 3 and through the whirling member 11 into the housing 2 so as to turn the turbine 12 and the rods 14 connected with it. The rods rotate around the filtering element 7, connected with the supporting ring 13. The uncleaned oil enters an annular cavity between the housing 2 and the filtering element 7 and flows around the magnetic screen which is formed by the magnetic plate 16 arranged on the rods 14. The magnetic particles are attracted by the magnetic plates 16, and subsequently the particles which are oriented in the magnetic field form "brushes" with bristles directed along the forces of flux of the magnetic field. The subsequent growth of the "brushes" leads to the formation of the concentrated zone around the helical "rods" 14. Non metallic particles are also partially caught in these zones. During rotation, the ferromagnetic "brushes" together with metallic other particles are thrown out with the stream of the moving oil into the lower part of the housing 2. The non-magnetic particles partially grow to form agglomerates, and upon reaching the surface of the filtering element 7, the particles are thrown out by the brushes 15. The cleaned oil passes through the filtering and perforated casing 18 and leaves through the pipe 4. The accumulated residual is collected in the lower part of the housing 2 and periodically drained through the pipe 5.

The rotatable brushes 15 prevent the formation of cast on the surface of the filtering element 7 due to continuous cleaning along the entire length and the entire perimeter. Since the magnetic screen is rotatable around the filtering element 7, the magnetic plates 16 are cleaned from mechanical admixtures during the operation of the filter separator, since the "brushes" formed on the surface of the magnetic plates from mechanical admixtures are thrown out into the lower part of the housing 2 under the action of forces generated during the rotation of the magnetic stream of oil.

Since the rods 14 have different angles of inclination to the surface of the filtering element 7 and different configurations, therefore when they are rotated, they change the attack angle and produce a changing turbulent stream which tears off particles from the surface of the filtering element and increase quality of purification. Since the rods are formed helical, the passage of the oil in the filter is improved.

The rotatable brushes 15 which are mounted on the helical strips prevent crust formation on the filtering element along the whole length and whole perimeter, and at the same time contribute to accelerated deposit of mechanical admixtures in a bottom of the filter.

It will be understood that each of the elements described above, or two or more together, may also find a useful application in other types of constructions differing from the types described above.

While the invention has been illustrated and described as embodied in the filter-separator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A filter separator, comprising a housing provided with inlet and outlet pipes, a filtering element arranged in said housing; a magnetic screen arranged in said housing, said magnetic screen including a plurality of helical rods and magnetic plates fixedly arranged on said helical rods, said helical rods being rotatable around said filtering element; and a rotary drive operative for rotating said helical rods.

2. A filter separator as defined in claim 1;

wherein said rotary drive is arranged in an upper part of said housing, said drive being connected with said helical rods.

3. A filter separator as defined in claim 1, wherein said helical rods are provided with brushes which are fixedly mounted on said rods at a side of said filtering element.

4. A filter separator, comprising a housing provided with inlet and outlet pipes, a filtering element arranged in said housing; a magnetic screen arranged in said housing, said magnetic screen including a plurality of helical rods and magnetic plates fixedly arranged on said helical rods, said helical rods being rotatable around said filtering element and different ones of said helical rods having different angles of inclination toward a surface of said filtering element; and a rotary drive operative for rotating said helical rods.

* * * * *